(12) United States Patent
Nayyeri

(10) Patent No.: US 6,835,403 B1
(45) Date of Patent: Dec. 28, 2004

(54) METHOD FOR SMOKING WHITE RICE

(75) Inventor: Sivoush Nayyeri, Irvine, CA (US)

(73) Assignee: Kusha, Inc., Irvine, CA (US)

( * ) Notice: Subject to any disclaimer, the term of this patent is extended or adjusted under 35 U.S.C. 154(b) by 204 days.

(21) Appl. No.: 10/243,856

(22) Filed: Sep. 13, 2002

(51) Int. Cl.[7] .............................................. A23L 1/232
(52) U.S. Cl. ....................................... 426/314; 426/442
(58) Field of Search .................................. 426/314, 442

(56) References Cited

U.S. PATENT DOCUMENTS

| | | | |
|---|---|---|---|
| 1,280,772 A | 10/1918 | Legg | |
| 2,116,223 A | 5/1938 | Stacey, Jr. | |
| 2,352,590 A | 6/1944 | Trinkle | |
| 3,503,760 A | 3/1970 | Allen | |
| 3,643,587 A | 2/1972 | Harrington et al. | |
| 3,870,804 A | * 3/1975 | Tolson et al. | ............... 426/618 |
| 4,303,452 A | 12/1981 | Ohira et al. | |
| 4,934,259 A | * 6/1990 | Watanabe | ..................... 99/339 |
| 6,203,834 B1 | * 3/2001 | Anders et al. | .............. 426/314 |
| 6,602,531 B2 | * 8/2003 | Naka et al. | .................. 426/314 |

FOREIGN PATENT DOCUMENTS

| | | | |
|---|---|---|---|
| EP | 0 925 718 | * | 6/1999 |
| JP | 363209554 | * | 8/1988 |

* cited by examiner

*Primary Examiner*—N. Bhat
(74) *Attorney, Agent, or Firm*—Walter A. Hackler

(57) ABSTRACT

Method and apparatus are provided for smoking de-husked rice which includes exposing porous holders containing de-husked rice to smoke at a temperature and humidity for a period of time sufficient to impart a smoke flavor to the rice without discoloration.

10 Claims, 1 Drawing Sheet

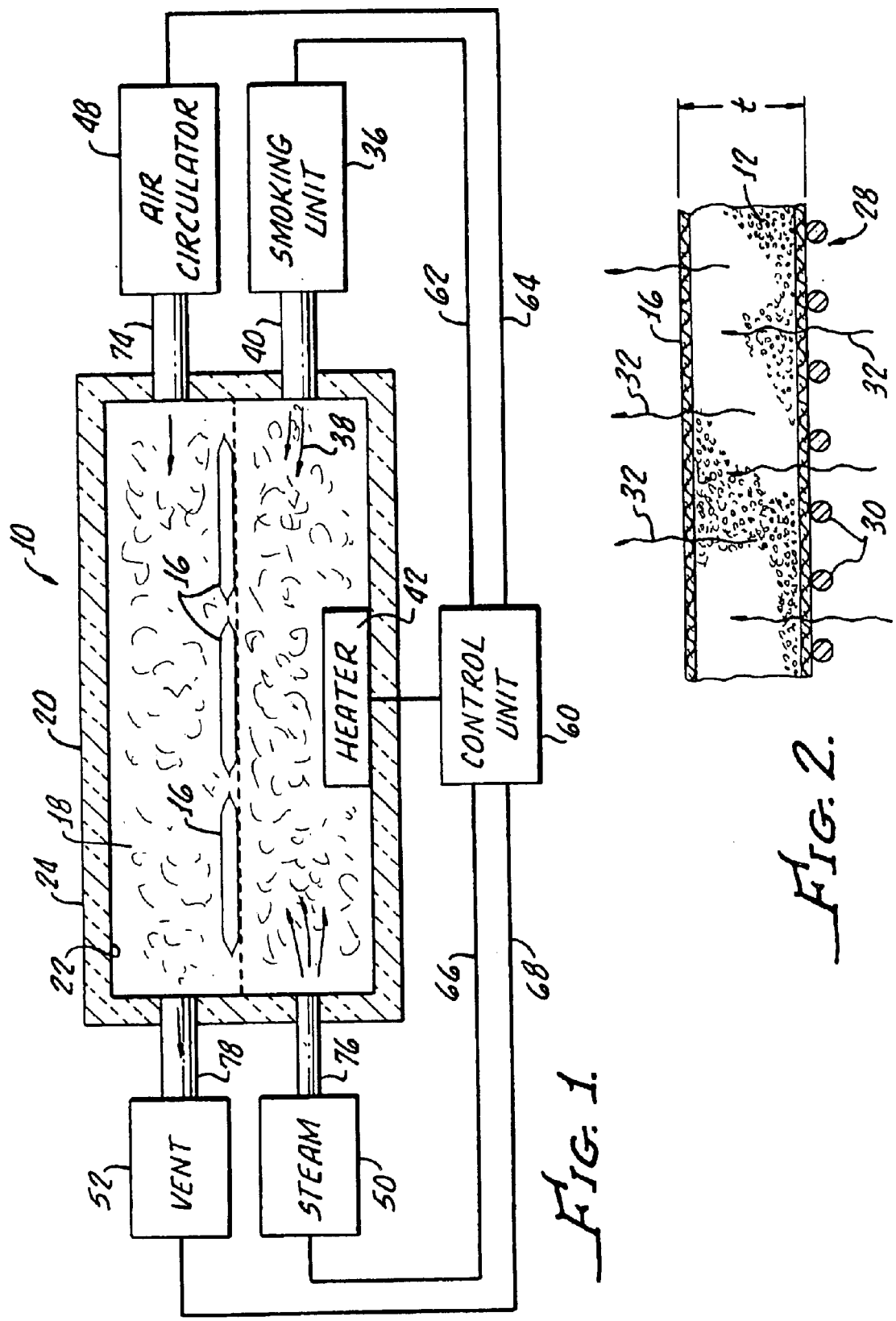

METHOD FOR SMOKING WHITE RICE

Present invention generally is directed to apparatus and methods for smoking of food products and is more specifically directed to apparatus and methods for smoking white rice.

Smoked rice is a specialty food item for many ethnic consumers. Traditionally, Middle Eastern rice millers use traditional smoking techniques to smoke long grain aromatic rice, particularly Basmati Rice, which has been proven favorable for smoking.

This smoking process may take fifteen days, or more, and involve laying paddied rice (unpolished rice in husks) on shelves in a large smoking house which is built from clay or bricks. Fire pits are placed in the middle of, the smoke house and rice husks are set fire twice a day. The processing of the rice in this manner allows smoke to permeate the rice and give it a specific flavor.

The smoking process is done before de-husking of the rice primarily to prevent discoloration of the rice as well as prevent breakage. It is apparent that this traditional smoking process is both time consuming and costly.

The present invention provides for apparatus and method for smoking rice with a faster processing time while also preventing rice discoloration and breakage.

SUMMARY OF THE INVENTION

A method in accordance with the present invention for smoking rice comprises the steps of disposing de-husked rice into a plurality of porous holders and thereafter exposing the plurality of porous holders containing the de-husked rice to smoke at a temperature and humidity and for a period of time sufficient to impart a smoke flavor to the rice. Because the method in accordance with the present invention utilizes de-husked rice, smoked rice produced by the method of the present invention is processed in much shorter times.

More particularly, the step of disposing the de-husked rice includes disposing a portion of the rice into porous bags and thereafter exposing the bags to a temperature of between about 100° and 130° and a humidity of between about 10% to about 15%. Under these conditions the rice is smoked within a period typically less than about 5 hours. This is to be compared to the traditional rice smoking techniques hereinabove noted wherein 15 days or more is required to obtain a desirable smoked rice.

More particularly, the step of disposing de-husked rice into bags includes disposing sufficient rice into each bag in an amount enabling the bags to be flattened during smoke exposure. Preferably the bags are flattened to a maximum thickness of about 2 inches. It should be appreciated that the thicker the bag the more time is necessary for the smoking process. Preferably, in accordance with the method of the present invention the bags are disposed in a chamber into which smoke is introduced.

Apparatus in accordance with the present invention includes a supply of de-husked rice, a plurality of porous holders for containing portions of the supplied rice, a chamber for receiving the holders with the rice therein and a smoke generator for supplying smoke to the chamber.

Preferably, the porous holders comprise a plurality of woven bags and the smoke generator is disposed exterior to the chamber and connected thereto by a duct. The enables providing the smoke at a more controlled level.

In order to facilitate an expedited process in accordance with the present invention the apparatus in accordance with the present invention may include a plurality of open grid shelves disposed within the chamber for supporting each of the bags containing portions of rice. Preferably the rice, as part of the present invention, is long grained rice, such as, for example, Basmati Rice.

Air conditioning apparatus is provided and is operable for maintaining and/or circulating air at a humidity of between about 10% and about 15% at a temperature of between 100° F. and about 130° F. within the chamber. In addition, each of the bags has a volume for containing between about 5 lbs. and 50 lbs. of rice and each of the bags is sized and includes a quantity of rice for enabling each bag to be flattened on one of the shelves. As an example, a 40 lb. bag may have dimensions of about 17 inches by about 27 inches and flattened to a thickness of less than about 1 inch.

BRIEF DESCRIPTION OF THE DRAWINGS

The advantages and features of the present invention will be better understood by the following description when considered in conjunction with the accompanying drawings in which:

FIG. 1 is a block representation of the apparatus in accordance with the present invention for practicing the method of the present invention for smoking rice generally showing a chamber for containing a plurality of porous holders each containing portions of rice, and apparatus for controlling humidity, temperature and smoke density within the chamber; and FIG. 2 is a cross section of a porous holder, such as a woven bag, containing rice shown flattened and disposed on an open grid shelf and illustrating permeation smoke through the bag for imparting a desired smoke flavor to rice contained by the bag without discoloration of the de-husked rice.

DETAILED DESCRIPTION

With reference to FIGS. 1 and 2 there is shown apparatus 10 for smoking rice, which includes a supply of de-husked rice 12 preferably disposed in a plurality of porous holders 16, such as, for example, woven bags made from many suitable porous material. The de-husked rice is an element of the present invention and distinguishes the apparatus 10 from earlier smoking apparatus (not shown) which includes husked rice.

As shown in FIG. 1 the apparatus further includes a chamber 18 formed by an insulated surrounding 20 which preferably includes stainless steel interior and exterior surfaces 22, 24.

Preferably, the holders 16 are supported within the chamber 18 by a plurality of open grid shelves 28 formed from spaced apart members 30, see FIG. 2, which enable permeation of smoke indicated by the arrows 32 through the porous bag 16 and the rice 12 therein. This should be appreciated that the chamber and attachments, hereinafter described, are manufactured entirely from high quality USDA approved stainless steel.

As shown in FIG. 1, a smoking unit, or generator, 36 is provided for introducing smoke indicated by the arrows 38 into the chamber 18.

Preferably, the smoke generator 38 is disposed exterior to the chamber and connected thereto by a duct 40 in order to maintain low and controllable heat within the chamber 18. Thus, the generation of smoke is not relied on for heating of the chamber 18.

Control of chamber 18 temperature is provided by a heater 42, which may be disposed within the chamber 18, as shown, or exterior to chamber and interconnected by ducts, not shown. Air conditioning apparatus which includes an air circulator 48, a steam generator 50, a vent 50, as well as the heater 42 is provided for maintaining and/or circulating air at a predetermined humidity and temperature within the chamber 18.

All of the air conditioning apparatus may be conventional in nature and operable for maintaining a humidity of between about 10% and about 15% and a temperature of between about 100° F. and about 138° F. within the chamber 18. Thus, the smoking process is a humid-thermal treatment with a combination of low air pressure.

Low heat, medium to high humidity, high wood-burnt smoke and controlled air circulation in the chamber is coordinated through a control unit 60 innerconnecting the smoking unit 36, air circulator 48, steam generator 50, and vent 52 by lines 62, 64, 66 and 68 respectively. Ducts 74, 76 and 78 interconnect the air circulator 48, steam generator 50 and vent 52 with the chamber 18, as shown in FIG. 1.

Preferably each of the bags 16 has a volume for containing between about 5 lbs. and about 50 lbs. of rice 12 and size to for enabling the bags 16 to be flattened an one of the shelves 28 to a maximum thickness, t, of about 2 inches. This configuration enables permeation of the rice 12 by the smoke 32 in a selected period of time, for example 5 hours, in order to impart a smoke flavor to the rice without discoloration thereof.

Thus, the method in accordance with the present invention for smoking rice comprises the steps of disposing de-husked rice into a plurality of porous bags 16 and exposing the plurality of porous bags 16 containing the de-husked rice 12 to smoke at a temperature and humidity and a period of time sufficient to import a smoke flavor to the rice.

More specifically, the rice is exposed within the chamber 18 to a temperature of between 100° F. and about 130° F. at a humidity of between about 10% to about 15% for up to about 5 hours controlled air circulation by the air circulator 48 in conjunction with the heater 42, steam generator 50 and vent 52, provides for a low heat, medium to high humidity, high-wood-burnt smoke for causing the rice to be smoked and the de-husked quality of the rice 12 enables such smoking to provide a desirable smoke flavor to the rice without discoloration thereof.

As hereinabove noted, preferably the rice is long grain rice such as, for example, Basmati Rice. Accordingly, the apparatus and method in accordance with the present invention guarantees a high level of production with the liability, at minimum energy and operation of costs.

Although there has been hereinabove described a specific method and apparatus in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclose herein. Accordingly, any and all modifications, variations or equivalent arrangements which may occur to those skilled in the art, should be considered to be within the scope of the present invention as defined in the appended claims.

What is claimed is:

1. A method for smoking rice comprising the steps of:

disposing de-husked rice into a plurality of porous holders; and exposing the plurality of porous holders containing de-husked rice to smoke at a temperature and humidity and for a period of time sufficient to impart a smoke flavor to the rice.

2. The method according to claim 1 wherein the step of disposing de-husked rice includes disposing portion of rice into bags.

3. The method according to claim 1 wherein the step of exposing the holders includes exposing the holders, with rice therein to a temperature of between about 100° F. and about 130° F. at a humidity of between about 10% and about %15 for up to about 5 hours.

4. The method according to claim 2 wherein the step of disposing de-husked rice into bags includes disposing sufficient rice in each bag in an amount enabling the bags to be flattened during smoke exposure, the bags being flattened to a maximum thickness of about 2 inches.

5. A method for smoking rice comprising the steps of:

disposing de-husked rice into porous bags;

disposing the bags with rice therein into a chamber; and introducing smoke into the chamber at a temperature and humidity and for a period of time until a predetermined taste is imported to the rice.

6. The method according to claim 5 wherein the step of introducing smoke into the chamber includes introducing smoke at a temperature of between about 100° F. and about 130° F. at a humidity of between about 10% and about 15%.

7. The method according to claim 6 wherein the step of introducing smoke into the chamber includes introducing the smoke for a period of time of up to about 5 hours.

8. The method according to claim 6 wherein the step of introducing smoke into the chamber for a period of time less than a time causing discoloration of the rice.

9. The method according to claim 8 wherein the step of disposing de-husked rice into bags includes disposing sufficient rice in each bag in a amount enabling the bags to be flattened during smoke exposed, the bag being fattened to a maximum thickness of about 2 inches.

10. The method according to claim 9 wherein as period of time is less claim about 5 hours.

* * * * *